United States Patent

Rosenberg et al.

[15] 3,637,479

[45] Jan. 25, 1972

[54] HALOGENATION PROCESS USING ULTRAVIOLET LIGHT

[72] Inventors: David D. Rosenberg, Niagara Falls; David U. Spinney, Grand Island, both of N.Y.

[73] Assignee: Hooker Chemical Corporation, Niagra Falls, N.Y.

[22] Filed: Jan. 12, 1970

[21] Appl. No.: 2,387

[52] U.S. Cl. .....................................204/163 R, 204/162 R
[51] Int. Cl. ............................................................B01j 1/10
[58] Field of Search ..................................204/163 R, 162 R

[56] References Cited

UNITED STATES PATENTS

| | | | |
|---|---|---|---|
| 2,509,160 | 5/1950 | McBee et al. | 260/648 |
| 2,561,209 | 7/1951 | Kittleson et al. | 204/163 R |
| 2,998,459 | 8/1961 | Baker et al. | 204/163 R |
| 3,329,731 | 7/1967 | Holiday | 204/163 R |
| 3,494,844 | 2/1970 | Holiday | 204/163 R |

*Primary Examiner*—Benjamin R. Padgett
*Attorney*—Peter F. Casella, Donald C. Studley, Richard P. Mueller, James F. Mudd and William J. Crossetta

[57] ABSTRACT

Liquid cyclopentadiene and chlorine are diluted in a polychlorocyclopentane solvent, reacting to form tetrachlorocyclopentane. The tetrachlorocyclopentane is then passed through an illuminated zone where gaseous chlorine is injected, effecting photochemical chlorination of the organic feed to form a hexachlorocyclopentane product. A portion of the circulating stream leaving the reaction zone is withdrawn as product of the reaction zone, the remainder being recirculated to provide the solvent for the conversion phase of cyclopentadiene and chlorine to tetrachlorocyclopentane.

3 Claims, No Drawings

HALOGENATION PROCESS USING ULTRAVIOLET LIGHT

This invention relates to a continuous process for the chlorination of cyclopentadiene. More particularly, this invention relates to a continuous two-stage chlorination system for the preparation of polychlorocyclopentane from cyclopentadiene, encompassing a prereaction zone, and a photochlorination zone, in a closed circulating system.

Polychlorocyclopentane having more than 5 chlorine atoms per mole is a desirable intermediate for the production of hexachlorocyclopentadiene. Various processes have been described for conversion of such materials to hexachlorocyclopentadiene by further chlorination. The preparation of the polychlorocyclopentane is normally carried out in at least two stages. In the first stage, addition chlorination of cyclopentadiene to a nominal composition of tetrachlorocyclopentane is normally effected at a low temperature to minimize formation of dimers or higher polymers. An inert diluent, such as carbon tetrachloride, has been used to minimize dimerization. If dimers or higher polymers are formed, their polychlorinated derivatives cannot be vaporized or converted to hexachlorocyclopentadiene. Their presence and concentration can be determined by such simple test procedures as measurement of nonvolatile residue when a sample of polychlorinated cyclopentane is evaporated at atmospheric pressure.

In order to produce the desired polychlorocyclopentane having more than 5 chlorine atoms per mole, the tetrachlorocyclopentane is further chlorinated by various techniques. In one process, the chlorination is carried out at an elevated temperature in the presence of a catalyst such as arsenic trioxide. In a second process, the chlorination is carried out at progressively higher temperatures with a terminal temperature as high as 150° C. In both processes, the chlorination requires many hours for completion with extended exposure of the reaction intermediate to conditions causing formation of byproducts and secondary reaction products. Large excesses of chlorine are needed and the batch nature of the process requires close supervision for adequate control.

It is, therefore, an object of this invention to provide a novel process for producing polychlorocyclopentane in quantitative yields, by a continuous chlorination process.

Another object of the present invention is to produce polychlorocyclopentane by the chlorination of cyclopentadiene under stead-state conditions.

Another object of the present invention is the production of polychlorocyclopentanes by the chlorination of cyclopentadiene by rapid and efficient conversion at relatively moderate temperatures.

Another object of this invention is to produce hexachlorocyclopentane without the necessity of utilizing large excesses of chlorine.

These and additional objects will be obvious from the following description and claims.

It has unexpectedly been found that high-purity hexachlorocyclopentane can be produced in a continuous reaction system, operating under steady-state conditions, to give rapid and efficient conversion of cyclopentadiene to the desired polychlorocyclopentane.

The continuous process of the present invention entails essentially two stages. In the first stage, cyclopentadiene is chlorinated to a mixture of chlorinated products which are composed substantially of tetrachlorocyclopentane. This mixture is then passed to a photochemical chlorinator where it is further polychlorinated. The present process allows the continuous production of polychlorocyclopentane from cyclopentadiene, rapidly and at steady-state conditions, utilizing a minimum of excess chlorine.

More specifically, the present invention provides for the production of hexachlorocyclopentane from cyclopentadiene by a two-stage chlorination process within a continuous system. The first stage of this process involves, first, chlorination of the cyclopentadiene to add approximately 2 moles of chlorine, forming in essence "tetrachlorocyclopentane" which as described is actually "a mixture comprised predominantly of $C_5H_6Cl_4$ and $C_5H_5Cl_5$ and having a range in composition of $C_5H_{6-x}Cl_{4+x}$, $x$ varying from 0 to 1." The said "tetrachlorocyclopentane" is then passed to a photochemical chlorinator where it is further chlorinated at temperatures up to 110° C., to produce a more highly chlorinated polychlorocyclopentane product, which is substantially hexachlorocyclopentane having a range in composition of $C_5H_{6-x}Cl_{4+x}$, $x$ varying from 0 to 4. A portion of the product is removed and the remainder cooled and recirculated to form the diluent for the first stage of the continuous process.

It is known in the art that aliphatic and alicyclic hydrocarbons and partially chlorinated hydrocarbon derivatives thereof may be effected in chlorinators wherein gaseous hydrocarbon and gaseous chlorine are introduced continuously into a liquid mixture of the product in the reaction zone by diffusion means at points substantially removed from one another so as to minimize the possibility of explosion. The high temperatures desired to obtain quantitative yields for the production of hexachlorocyclopentane from cyclopentadiene, have posed a problem because of the tendency of the cyclopentadiene to polymerize. Further, since "tetrachlorocyclopentane" is unstable, handling of the prior art product of the reaction between cyclopentadiene and gaseous chlorine has also posed a problem.

I have found that these related problems may be overcome by incorporation of the heretofore mentioned prior art processes in a new continuous system using new inventive techniques.

In my invention, gaseous chlorine and chilled purified cyclopentadiene were fed separately into the external circulating line of the photochemical chlorinator. The location of the chlorine feed point with respect to the cyclopentadiene feed point is not critical, provided that good mixing with the circulating chlorine-laden polychlorocyclopentane diluent is insured. Good mixing in the reaction zone is essential to the effective operation of this process. The cyclopentadiene immediately reacts with the gaseous chlorine to form "tetrachlorocyclopentane" component which is then immediately passed to the ultraviolet zone of the photochemical chlorinator. It is in this zone, and not the circulatory zone as indicated by prior art, that gaseous chlorine is introduced to react with the "tetrachlorocyclopentane" to produce a product containing polychlorocyclopentane (essentially hexachlorocyclopentane). A portion of the produced polychlorocyclopentane is then removed and recovered, the remainder of the product is then cooled and recirculated to the first stage to act as a diluent in the production of the first stage tetrachlorocyclopentane. The use of a portion of our product, substantially hexachlorocyclopentane, as a diluent is important in that it is more stable than tetrachlorocyclopentane, thereby diminishing solvent handling difficulties. The temperature of the continuous chlorinator system may vary between 30° and 110° C. A temperature below 110° C. is desired in the first stage, the rate of circulation of the diluent being used for control. The temperature of the ultraviolet zone in the photochemical chlorinator should be maintained below approximately 110° C. Since the reaction is highly exothermic, this control is initiated by cooling the recirculated product, the rate of circulation, then, further controlling the temperature of the first stage.

The advantages of this novel invention are many. Firstly, temperature control is accomplished by both circulatory rate and cooling, Since the temperatures involved are relatively high, yield is great and water cooling can be initiated rather than refrigeration. Use of the more stable hexachlorocyclopentane as a diluent is an advantage in that undesired byproducts will be kept to a minimum. Time is another factor of importance, in that rather than the approximately 25 hours disclosed for the production of hexachlorocyclopentane of the prior art, our invention has a polychlorocyclopentane residence time within the system of less than 9 hours.

The above description and the following examples further illustrate our invention but it is to be understood that the specific details in the description and examples have been chosen for the purpose of illustration and are not intended to limit our invention except as defined in the appended claims.

EXAMPLE 1

The chlorination apparatus employed to obtain the data of the following example consisted of a section exposed to actinic light and a light shielded external circulating loop. The liquid polychlorocyclopentane from the irradiated section of the chlorinator was pumped continuously through the circulating loop. The liquid volume in the chlorination system was about 2,000 milliliters and was turned over once every minute. The circulating line was fabricated of ¼-inch diameter nickel pipe. Two sections of jacketed nickel pipe ¾-inch diameter by 18 inches long were installed in the line to control the temperature of the circulating liquid. The glass section of the chlorination system was a 48-inch long, 2-inch diameter piece of glass pipe. While running, the liquid height in this section was maintained at about 25 inches equivalent to a volume of about 1,300 milliliters. Around this 25-inch section were arranged 3 GE H100-A4/T mercury-arc lamps. Each light could be controlled or positioned independently. Any necessary further description of the photochemical chlorinator can be obtained by reference to U.S. Pat. No. 2,899,370, issued Apr. 11, 1959, hereby incorporated therein.

After the light source had been turned on and it reached normal operating intensity, the circulating stream of polychlorocyclopentanes was initiated. The gaseous chlorine and chilled purified cyclopentadiene were separately fed into the external circulating line of the chlorinator. The cyclopentadiene was fed by a volumetric pump and injected into the line to assure good mixing with the circulating chlorine-laden polychlorocyclopentane.

The continuous cyclopentadiene chlorination system was operated as described above. The reaction temperature in the chlorinator was maintained at 50° C. Cyclopentadiene was fed to the chlorinator at the rate of 1.94 grams per minute for a total of 3,028.1 grams. Chlorine was fed to the chlorinator at the rate of 10.2 grams per minute for a total of 15,912 grams. The continuous cyclopentadiene chlorinator was run for a total of 26 hours, the residence time of the product, polychlorocyclopentane, being 7.22 hours at the rate of 7.70 grams per minute to a total of 12,023 grams. Analysis of our product, polychlorocyclopentane, showed specific gravity at 20° C. to be 1.680 to 1.695. Two samples were analyzed to determine weight percent organic $Cl_2$, and were found to have 75.4 percent and 76.4 percent, respectively. This corresponded to a polychlorocyclopentane showing an average composition of C 5, H 4.4, Cl 5.6 (at 75.4 percent) and C 5, H 4.15, Cl 5.85 (at 76.4 percent). The average percent residue upon evaporation was 0.45.

EXAMPLE 2

The continuous cyclopentadiene cyclopentadiene chlorination system was operated as described above, the reaction temperature in the chlorinator was maintained between 90° and 100° C. Cyclopentadiene was fed to the chlorinator at the rate of 1.81 grams per minute for a total of 3,156.7 grams. Chlorine was fed to the chlorinator at the rate of 9.88 grams per minute for a total of 17,202 grams. The chlorinator was run for 29 hours, the residence time of the product, polychlorocyclopentane, in the chlorinator being 7.87 hours. The polychlorocyclopentane product was produced at the rate of 7.05 grams per minute to a total of 12,284 grams. Analysis of the product, polychlorocyclopentane, showed it to have a specific gravity at 20° C. of 1.686 to 1.700. The weight percent of organic $Cl_2$ was found to be 76.2, corresponding to our product, polychlorocyclopentane, having an average composition of C 5, H 4.2, Cl 5.8. The average percent residue upon evaporation was 0.54.

EXAMPLE 3

The continuous cyclopentadiene chlorination system was operated as described above, the reaction temperature of the chlorinator was maintained at 90° C. Cyclopentadiene was fed to the chlorinator at the rate of 1.42 grams per minute for a total of 3,157 grams. Chlorine was fed to the chlorinator at the rate of 10.5 grams per minute for a total of 23,472 grams. The chlorinator was run for 37 hours, residence time of the polychlorocyclopentane in the chlorinator being 9.68 hours. The product, polychlorocyclopentane, was produced at the rate of 5.90 grams per minute for a total of 13,097 grams. Analysis of the product, polychlorocyclopentane, showed it to have a specific gravity at 20° C. of 1.724 to 1.732 and a weight percent of organic chlorine of 78.1. The above analysis corresponding to a polychlorocyclopentane product having an average composition of C 5, H 3.6, Cl 6.4.

What is claimed is:

1. A continuous process for the production of polychlorocyclopentanes, comprised of predominantly $C_5H_4Cl_6$, having a range in composition of $C_5H_{6-x}Cl_{4+x}$, $x$ varying from 0 to 4, comprising the steps of:
   1. reacting chlorine with cyclopentadiene in a liquid circulating polychlorocyclopentane diluent to produce a substantially tetrachlorinated cyclopentane component,
   2. passing said tetrachlorinated cyclopentane and diluent into an ultraviolet zone,
   3. introducing chlorine gas into said ultraviolet zone,
   4. reacting in said zone said gaseous chlorine with said tetrachlorinated cyclopentane component to produce a product containing polychlorocyclopentane,
   5. removing and recovering a portion of said polychlorocyclopentane, and
   6. recirculating the remainder of said product to step (1).

2. The process of claim 1 wherein the temperature of the process is from 30° to about 110° C.

3. The process of claim 1 whereby the recirculated diluent is substantially $C_5H_4Cl_6$.

* * * * *

PO-1050
(5/69)

UNITED STATES PATENT OFFICE
CERTIFICATE OF CORRECTION

Patent No. 3,637,479  Dated January 25, 1972

Inventor(s) David S. Rosenberg and David U. Spinney

It is certified that error appears in the above-identified patent and that said Letters Patent are hereby corrected as shown below:

On the Title page of the patent under Inventors "David D. Rosenberg" should read ---David S. Rosenberg---.

Signed and sealed this 15th day of August 1972.

(SEAL)
Attest:

EDWARD M. FLETCHER, JR.
Attesting Officer

ROBERT GOTTSCHALK
Commissioner of Patents